T. H. SPENCER.
Tooth Brush.

No. 64,455.  
Patented May 7, 1867.

Witnesses:  
John D. Thurston  
Charles E. Spencer

Inventor:  
Thomas H. Spencer

United States Patent Office.

THOMAS H. SPENCER, OF PROVIDENCE, RHODE ISLAND.

Letters Patent No. 64,455, dated May 7, 1867; antedated April 23, 1867.

IMPROVEMENT IN TOOTH-BRUSHES.

The Schedule referred to in these Letters Patent and making part of the same.

TO ALL WHOM IT MAY CONCERN:

Be it known that I, THOMAS H. SPENCER, of the city and county of Providence, in the State of Rhode Island, have invented a new and useful Improvement in Tooth-Brushes; and I do hereby declare that the following specification, taken in connection with the drawings annexed, is a full, clear, and exact description thereof.

Figure 1:
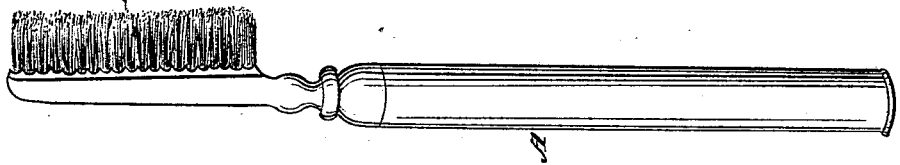

Figure 1 is a perspective view.

Figure 4:
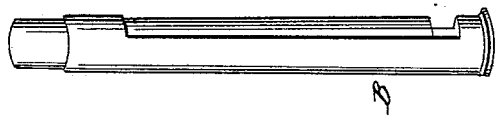
Figure 3:
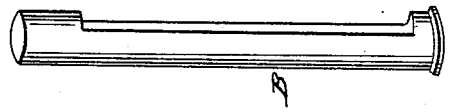
Figure 2:

Figures 2, 3, and 4 are parts of my invention.

In the accompanying drawings, A, figs. 1 and 2, is a tube of metal or any hard substance, attached at one end to a tooth-brush, forming a handle, the opposite end of which is left open for the purpose of inserting a dentifrice. B, figs. 3 and 4, is a smaller tube, partially cut off at its side a suitable distance from each end longitudinally, forming a slide and made to fit easily in the tube or handle A. This slide B being closed at one end, is provided with a flange for the purpose of preventing it from passing too far into the tube or handle A and for drawing it out when required to be used. The opposite end of slide B is left open for the purpose of sliding the dentifrice out to be used, by pushing it with the thumb or finger at the longitudinal cut, as shown in fig. 4.

The advantages of my invention are plainly seen, as the dentifrice is combined in the brush, making it less cumbersome in travelling as well as at other times. Also, in case the brush becomes worn or broken, another can be easily attached, thus avoiding the expense of a new handle; and it can be made in any style or form, whether fancy or otherwise.

I do not claim the attaching of a handle to a tooth-brush; but what I do claim, and wish to secure by Letters Patent of the United States, is—

A tooth-brush having a detachable handle and a dentrifrice-container therein, substantially as described.

THOMAS H. SPENCER.

Witnesses:
JOHN D. THURSTON,
CHARLES L. SPENCER.